Oct. 29, 1963     D. E. KNIGHT     3,108,390
FISHING LURE
Filed May 10, 1962
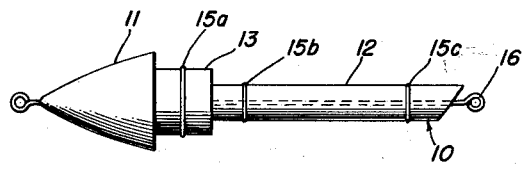
Fig. 1.
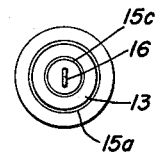
Fig. 2.
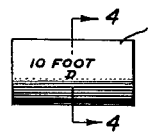      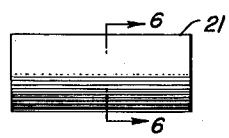   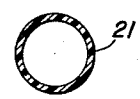
Fig. 3.    Fig. 4.    Fig. 5.    Fig. 6.
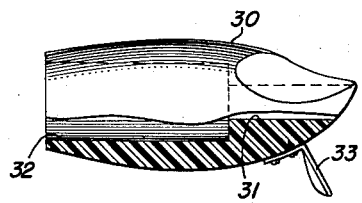     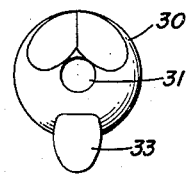
Fig. 7.     Fig. 8.
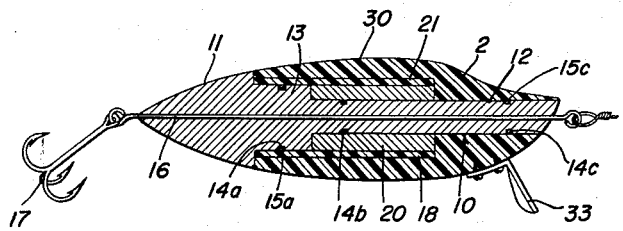
Fig. 9.
INVENTOR
DOUGLAS E. KNIGHT
BY Kenyon, Palmer, Stewart & Estabrook
ATTORNEYS

United States Patent Office 3,108,390
Patented Oct. 29, 1963

3,108,390
FISHING LURE
Douglas E. Knight, 5005 McCall St., Rockville, Md.
Filed May 10, 1962, Ser. No. 193,696
5 Claims. (Cl. 43—42.09)

This invention relates generally to improvements in fishing lures and more specifically to plug type fishing lures which can be furnished in kit form with various interchangeable component parts to provide a lure having variable characteristics to render it readily adaptable to varying fishing conditions.

There are, at present, many types of lures available to the fisherman. Some of these lures are individually tailored to meet specific fishing conditions and, therefore, require that a fisherman stock and carry may lures to meet the various conditions he is likely to encounter. There are other lures in the art which have, to varying degree, changeable characteristics to provide for the changing conditions which may be met. This invention relates to this latter type of lure and has as an object, provision of an improved lure which is easy to manufacture, simple to assemble and disassemble, is durable and has great strength characteristics, comprises a minimum number of parts, and can be furnished as a simple and compact kit.

Other objects and many of the attendant advantages of this invention will be readily appreciated as the same become better understood by reference to the following detailed description when considered in connection with the accompanying drawings in which like reference numbers designate like parts throughout the figures thereof and wherein:

FIG. 1 is a side elevation of the core portion of the lure;

FIG. 2 is a front elevation of the core portion of the lure;

FIG. 3 is a side elevation of a weight member of the lure;

FIG. 4 is a section on the line 4—4 of FIG. 3;

FIG. 5 is a side elevation of a visual characteristic carrying member of the invention; and;

FIG. 6 is a section on the line 6—6 of FIG. 5;

FIG. 7 is a side elevation of the outer body portion of the lure;

FIG. 8 is a front elevation of the body portion shown in FIG. 7; and

FIG. 9 is a cross-sectional side view of a preferred embodiment of the lure of the present invention.

In general, the objects of the present invention are carried out by providing in kit form, a lure made up of a plurality of readily assemblable and interchangeable parts. One of the interchangeable parts is useful to vary the depth to which the lure will normally travel and others are effectively combined therewith to change the color or pattern of the lure.

Referring now to the drawings for a complete description of the present invention, FIGS. 1 and 7 show preferred embodiments of the two parts of the lure which are always used and which when assembled as shown in FIG. 9 define the over-all external configuration of the lure. It will of course be appreciated that the external configuration shown is illustrative only and the present invention is readily adaptable to an infinite variety of external shapes. The interchangeable weight and color or pattern changing members are received within the lure in a space defined by the external members of FIGS. 1, 2, 7 and 8. Such interchangeable members are preferably hollow right circular cylinders and illustrated in FIGS. 3-6 inclusive.

FIGS. 1 and 2 illustrate one of the two permanent parts of the lure and the one on which all of the remaining components are structurally assembled. As shown, this part, designated generally by the reference numeral 10, includes a tapered tail portion 11, an elongated cylindrical portion 12 and a further cylindrical portion 13 positioned between the tail 11 and the portion 12 and having a larger diameter than the portion 12. The two cylindrical portions 12 and 13 include annular grooves 14a, 14b and 14c (see FIG. 9) for the reception of annular resilient rings 15a, 15b and 15c, the function of which will be described hereinafter.

An elongated wire or rod 16 extends completely through the member 10 and includes an eye formed on each end. The rear eye is used to mount the hook assembly 17 while the front eye permits attachment of the lure to the line.

FIGS. 3 and 4 show an interchangeable weight member 20 in the form of a hollow right circular cylinder. This may be formed of lead or lead alloy and preferably carries visual indicia to inform the user of either the weight or the depth to which the lure will travel. This is assembled on the member 10 concentrically around the cylindrical portion 12 and positioned to abut the enlarged cylindrical portion 13 as shown in FIG. 9. The resilient ring 15b is effective to hold the weight member in place.

FIGS. 5 and 6 show a second interchangeable member 21 also in the form of a hollow right circular cylinder the inside diameter of which is slightly larger than that of the weight member 20. It is this member which is supplied in a variety of colors and/or patterns which is effective to change the external appearance of the lure when assembled as shown in FIG. 9. To assemble, the member 21 is positioned concentrically with the weight member 20 and the resilient ring 15a is effective to hold it in place.

FIGS. 7 and 8 show the remaining structural element of the lure comprising the main body portion 30. This element is externally contoured to mate with the part 10 so as to define therewith when assembled as shown in FIG. 9, a smooth configuration for the external surface of the lure. This body portion includes a pair of concentric bores 31 and 32 which in the assembled relation of FIG. 9 surround the two interchangeable members 20 and 21 and the forward cylindrical portion 12 of the part 10. When thus assembled this body portion is held in place by the resilient ring 15c.

The body member is preferably transparent or translucent over at least a substantial percentage of its overall size so that the colors and/or patterns carried by the member 21 are clearly visible therethrough. In addition, the body portion carries at its forward end on the under surface thereof a conventional dive and wobble plate 33 which is effective when the lure is being retrieved to impart a lifelike action thereto.

From the foregoing, it will be apparent that by using the two permanent members 10 and 30, a wide variety of lures can be assembled by using therewith different combinations of the interchangeable weight members 20 and color or pattern members 21. While the permanent members 10 and 30 are preferably formed of a suitable molded plastic material, the member 10 could be wooden or could be of any lightweight alloy. The color or pattern member 21 is also preferably formed of a suitable molded or extruded plastic but it could also be formed of a light metallic alloy. The weight member is preferably of a lead alloy. In order that all of the interchangeable weight members be held to substantially the same physical dimensions, different weights can be achieved through the use of different alloys or by perforating the side walls.

It is contemplated that the respective parts of the lure will be furnished in a kit form, comprising: a single body and tail member, a series of weight members calibrated for various depths of lure travel such, for example, as increments of one foot, and a series of visual characteristic carrying members of necessary variation in color and design to enable the possessor to cope with a number of fishing conditions. It is also contemplated that materials such as paints and brushes may be furnished as part of the kit to provide the possessor with the capability of varying the color of the visual characteristic carrying member 18 according to his desires and inclinations.

The resulting structure is a strong integral and relatively solid fishing lure in which the strain produced by the pull of a fish, when caught, is transmitted through the structure on rod 16 and thereby avoiding stress on the assembled structural parts of the lure.

Obviously many modifications and variations of the present invention are possible in the light of the above teachings. It is therefore to be understood that, within the scope of the appended claims, the invention may be practiced otherwise than as specifically described.

What is claimed as new and desired to be secured by Letters Patent of the United States is:

1. A fishing lure comprising: a core member including a tail portion, a first mounting portion and a second mounting portion extending forwardly from said tail portion, said second mounting portion being of smaller cross-section than said first mounting portion; a hollow weight member sildingly frictionally received on said second mounting portion; a colored sleeve surrounding said weight member and slidingly frictionally received on said first mounting portion; and a hollow transparent body member surrounding said weight member and said sleeve, slidably frictionally held on the forward portion of said second mounting portion, with its rear portion abutting the forward end of said tail portion.

2. A fishing lure comprising: a rod member having attaching means at each end thereof; a core member surrounding said rod member, substantially coextensive therewith and including a tail portion, a first cylindrical portion and a second cylindrical portion extending forwardly from said tail portion, said second cylindrical portion being of smaller diameter than said first cylindrical portion; a hollow cylindrical weight member slidingly frictionally received on said second cylindrical portion; a colored sleeve surrounding said weight member and slidingly frictionally received on said first cylindrical portion; a hollow transparent body member surrounding said weight member and said sleeve, slidingly frictionally held on the forward portion of said second cylindrical portion, with its rear portion abutting the forward end of said tail portion and hook means attached to the rear of said rod member.

3. A fishing lure comprising: in coaxial laminar relationship, a rod member having eyelets on either end; a core member having a tail portion on one end thereof, said core member having a first and second cylindrical portion of different diameters extending forwardly from said tail portion, said core member being substantially coextensive with said rod member; a first resilient annular ring coaxially disposed on said first portion and fixed thereto, a second and third resilient annular ring coaxially disposed in spaced relationship on said second portion and fixed thereto; a weight member slidably disposed over said second core portion in frictional engagement with said second annular ring; a visual characteristic carrying annular sleeve member slidably disposed over said weight member and said second portion of said core member, said sleeve member also being in frictional engagement with said first annular ring; a transparent body member having a hollow cylindrical recess in the rear portion thereof, said body member further having a reduced cylindrical passage through the front portion thereof coaxially communicative with said recess, said body member being slidably disposed over said second portion of core member and said sleeve member, the inner surface of said passage being in frictional engagement with said third annular ring.

4. A fishing lure comprising: a transparent body member having a hollow cylindrical recess in the rear end thereof, said body further having a reduced cylindrical passage through the front end thereof, coaxially disposed and communicative with said recess; a hollow cylindrical visual characteristic carrying sleeve slidably disposed in said recess and coextensive therewith; a hollow cylindrical weight member slidably disposed within said sleeve, said weight member being of substantially shorter length than said sleeve member and disposed to leave an unoccupied portion in the mouth thereof; a tail portion having essentially frusto-conical shape, a first cylindrical forward extension on said tail portion having a first annular groove disposed on the periphery thereof, a first resilient annular ring disposed in said groove, said first extension being slidably disposed in said sleeve, said first ring frictionally engaging the inner cylindrical surface of said sleeve, a second cylindrical forward extension substantially smaller than and coaxially disposed with said first cylindrical extension, said second extension having a second annular groove disposed on the periphery thereof adjacent to said first extension, a second annular elastic ring disposed in said groove, said second extension slidably disposed through said weight member, said second ring frictionally engaging the interior surface of said weight member, said second extension having a third annular groove disposed on the periphery thereof in a forwardly spaced relationship from said second groove, a third annular elastic ring disposed in said third groove, said second extension being slidably disposed through said reduced cylindrical passage of said body member, said third ring frictionally engaging the interior of said reduced cylindrical passage; and a rod member coaxially disposed through said tail member and said first and second extensions, said rod member having eyelets fixably attached to either end thereof.

5. A fishing lure comprising: in coaxial and contiguous laminar relationship, a rod member having eyelets on either end thereof, a cylindrical core member coextensive with said rod member, a tubular weight member slidably mounted to said core member, a tubular visual characteristic carrying member slidably mounted to said weight member, a transparent body portion slidably mounted over said visual characteristic carrying member, said core member having cylindrical portions with different diameters, said portions disposed to provide a surface of said core member in slidable contact with an inner surface of each of said members mounted thereon, each of said surfaces having a resilient annular ring mounted thereon to frictionally engage and retain said mounted members.

References Cited in the file of this patent
UNITED STATES PATENTS

| | | |
|---|---|---|
| 1,723,557 | Ono | Aug. 6, 1929 |
| 2,517,375 | Anderson | Aug. 1, 1950 |
| 2,733,535 | Rosen | Feb. 7, 1956 |
| 3,010,243 | Dickinson | Nov. 28, 1961 |